(12) United States Patent
Duan et al.

(10) Patent No.: US 12,204,951 B2
(45) Date of Patent: Jan. 21, 2025

(54) DIKW RESOURCE TRANSFER METHOD AND DEVICE FOR PURPOSE-ORIENTED CALCULATION AND INFERENCE

(71) Applicant: HAINAN UNIVERSITY, Haikou (CN)

(72) Inventors: Yucong Duan, Haikou (CN); Yuxiao Lei, Haikou (CN)

(73) Assignee: HAINAN UNIVERSTIY, Haikou (CN)

( * ) Notice: Subject to any disclaimer, the term of this patent is extended or adjusted under 35 U.S.C. 154(b) by 0 days.

(21) Appl. No.: 17/624,252

(22) PCT Filed: Dec. 28, 2021

(86) PCT No.: PCT/CN2021/141863
§ 371 (c)(1),
(2) Date: Dec. 30, 2021

(87) PCT Pub. No.: WO2023/077642
PCT Pub. Date: May 11, 2023

(65) Prior Publication Data
US 2024/0045735 A1    Feb. 8, 2024

(30) Foreign Application Priority Data
Nov. 5, 2021   (CN) .......................... 202111297647.1

(51) Int. Cl.
G06F 9/46     (2006.01)
G06F 9/50     (2006.01)
G06F 40/30    (2020.01)
G06N 5/02     (2023.01)

(52) U.S. Cl.
CPC ............ *G06F 9/5083* (2013.01); *G06F 40/30* (2020.01); *G06N 5/02* (2013.01)

(58) Field of Classification Search
CPC .......... G06F 9/5083; G06F 40/30; G06N 5/02
See application file for complete search history.

(56) References Cited

U.S. PATENT DOCUMENTS

2005/0125521 A1*  6/2005  Grimm ................. G06F 9/5083
                                                709/223
2015/0227845 A1    8/2015  Hakkani-Tur et al.

FOREIGN PATENT DOCUMENTS

| CN | 109101545 A | 12/2018 |
| CN | 111274819 A | 6/2020  |
| CN | 111597433 A | 8/2020  |

(Continued)

OTHER PUBLICATIONS

Duan et al., Modeling Data, Information and Knowledge for Security Protection of Hybrid IoT and Edge Resources, IEEE Access, vol. 7, pp. 99161-99176, dated Aug. 7, 2019.

(Continued)

*Primary Examiner* — Gregory A Kessler
(74) *Attorney, Agent, or Firm* — Westbridge IP LLC

(57) ABSTRACT

The present application discloses a DIKW resource transfer method and device for purpose-oriented calculation and inference. The method includes: determining a resource to be matched by traversing a first resource system corresponding to a receiver based on an acquired target purpose, and determining a target resource based on the resource to be matched and a second resource system. The embodiments of the present disclosure can reduce the waste of the target resource, lowering transfer loss, and decrease the risk of transfer failure.

13 Claims, 3 Drawing Sheets

(56) References Cited

FOREIGN PATENT DOCUMENTS

| CN | 112925921 A | 6/2021 |
|---|---|---|
| CN | 113032832 A | 6/2021 |
| CN | 113377971 A | 9/2021 |

OTHER PUBLICATIONS

International Search Report issued in corresponding PCT Application No. PCT/CN2021/141863, dated Jul. 28, 2022.
Lei et al., AI Governance Oriented Legal to Technology Bridging Framework for Cross-modal Privacy, Computer Science, vol. 48, No. 9, pp. 9-20, dated Sep. 30, 2021.
Written Opinion issued in corresponding PCT Application No. PCT/CN2021/141863, dated Jul. 28, 2022.

\* cited by examiner

DIKW RESOURCE TRANSFER METHOD AND DEVICE FOR PURPOSE-ORIENTED CALCULATION AND INFERENCE

CROSS REFERENCE TO RELATED APPLICATIONS

The present application is the National Stage of International Application No. PCT/CN2021/141863, filed Dec. 28, 2021, which claims the benefit of Chinese Patent Application No. 202111297647.1 filed Nov. 5, 2021, the entire contents of which are hereby incorporated by reference.

TECHNICAL FIELD

The present disclosure relates to the technical field of network data transfer, and in particular to a DIKW resource transfer method and device for purpose-oriented calculation and inference.

BACKGROUND

In the Internet age, the transfer of content from a sender to a receiver is driven by at least one purpose. Transmission contents exist in the transfer chain in various forms such as text (TXT), image (IMG), video (VDO), audio (ADO), etc., which are generally referred to as user-generated content (UGC).

The transfer process of UGC from the sender (Sed) to the receiver (Rev) is driven by the transfer purpose of the sender ($Pup_{sed}$). The final degree of completion of $Pup_{sed}$ is the criterion for judging the excellence of the transfer result. The realization and completion of $Pup_{sed}$ depends not only on Rev's ability to realize the purpose, but also on Rev's ability to understand the purpose. During the transfer of UGC, the spread deviation ($DVT_{SR}$) between Sed and Rev made Rev unable to understand Sed's purpose or overestimated Rev's ability to understand. $DVT_{SR}$ exists in the transfer process and will affect the subsequent implementation of $Pup_{sed}$.

UGC is the carrier of $Pup_{sed}$, and the interpretation of $Pup_{sed}$ during transfer is a crucial part. A wrong interpretation of $Pup_{sed}$ will lead to a deviation of the subsequent $Pup_{sed}$ realization direction, which will eventually lead to transfer failure or waste of resources.

SUMMARY

Embodiments of the present disclosure provide a DIKW (Data Information Knowledge Wisdom) resource transfer method and device for purpose-oriented calculation and inference, which reduces the waste of target resources, reduces transfer loss, and reduces the risk of transfer failure.

An embodiment of the present disclosure provides a DIKW resource transfer method for purpose-oriented calculation and inference, including:
  acquiring a target purpose;
  determining a resource to be matched by traversing a first resource system corresponding to a receiver based on the target purpose; and
  determining a target resource based on the resource to be matched and a second resource system.

Further, the determining a target resource based on the resource to be matched and a second resource system may comprise:
  acquiring a set of candidate resources corresponding to the resource to be matched by traversing the second resource system; and
  determining the target resource from the set of candidate resources based on a degree of matching between each candidate resource in the set of candidate resources and the resource to be matched.

Further, the acquiring the target purpose may comprise:
  acquiring a generated content to be transferred; and
  performing purpose recognition processing on the generated content to be transferred to obtain the target purpose.

Further, types corresponding to the generated content to be transferred comprise a text type, an image type, a video type or an audio type; and
  before performing purpose recognition processing on the generated content to be transferred to obtain the target purpose, the method further comprises:
  if the type corresponding to the generated content to be transferred is the text type, encoding the generated content to be transferred to obtain an encoded generated content to be transferred;
  or
  if the type corresponding to the generated content to be transferred is the image type, the video type, or the audio type, performing text conversion processing on the generated content to be transferred to obtain a text-conversion-processed generated content to be transferred; and encoding the text-conversion-processed generated content to be transferred to obtain an encoded generated content to be transferred.

The method may further comprise:
  if the type corresponding to the generated content to be transferred is the text type and a text subtype corresponding to the generated content to be transferred is a probability type, performing data conversion processing on the generated content to be transferred to obtain a processed generated content to be transferred, a text subtype corresponding to the processed generated content to be transferred being a logic type; and
  determining the processed generated content to be transferred as the target resource, the type corresponding to the target resource being a data type.

The method may further comprise:
  if the type corresponding to the generated content to be transferred is the video type, determining a set of semantic objects from the generated content to be transferred;
  acquiring attribute information and motion information corresponding to each semantic object in the set of semantic objects; and
  determining the target resource based on the attribute information and the motion information corresponding to each semantic object, the type corresponding to the target resource being an information type.

Further, the first resource system comprises a data system, an information system, a knowledge system, a value system, and an objective system,
  wherein the data system, the information system, the knowledge system, the value system, and the objective system form a tree structure or a flat structure.

An embodiment of the present disclosure also provides a DIKW resource transfer device for purpose-oriented calculation and inference, including:
  a first acquiring module configured to acquire a generated content to be transferred;
  a recognizing module configured to perform purpose recognition processing on the generated content to be transferred to obtain a target purpose;

a first determining module configured to determine a resource to be matched by traversing a first resource system corresponding to a receiver based on the target purpose; and a second determining module configured to determine a target resource based on the resource to be matched and a second resource system.

Further, the second determining module may include:

a traversing unit configured to traverse the second resource system to obtain a set of candidate resources corresponding to the resource to be matched; and a determining unit configured to determine the target resource from the set of candidate resources based on a degree of matching between each candidate resource in the set of candidate resources and the resource to be matched.

Further, the first acquiring module may include:

an acquiring unit configured to acquire the generated content to be transferred; and a recognizing unit configured to perform purpose recognition processing on the generated content to be transferred to obtain the target purpose.

Further, types corresponding to the generated content to be transferred include text type, image type, video type, or audio type, and the above device may also include:

an encoding module configured to, before performing purpose recognition processing on the generated content to be transferred, if the type corresponding to the generated content to be transferred is the text type, encode the generated content to be transferred to obtain an encoded generated content to be transferred;

or configured to, before performing purpose recognition processing on the generated content to be transferred, if the type corresponding to the generated content to be transferred is the image type, the video type or the audio type, perform text conversion processing on the generated content to be transferred to obtain a text-conversion-processed generated content to be transferred; and encode the text-conversion-processed generated content to be transferred to obtain an encoded generated content to be transferred.

Further, the above device may further include:

a conversion processing module configured to, if the type corresponding to the generated content to be transferred is the text type and a text subtype corresponding to the generated content to be transferred is a probability type, perform data conversion processing on the generated content to be transferred to obtain a processed generated content to be transferred, the text subtype corresponding to the processed generated content to be transferred being a logic type; and a third determining module configured to determine that processed generated content to be transferred as the target resource, the type corresponding to the target resource being a data type.

Further, the above device may further include:

a fourth determining module configured to, if the type corresponding to the generated content to be transferred is the video type, determine a set of semantic objects from the generated content to be transferred;

a second acquiring module configured to acquire attribute information and motion information corresponding to each semantic object in the set of semantic objects; and a fifth determining module configured to determine the target resource based on the attribute information and motion information corresponding to each semantic object, the type corresponding to the target resource being an information type.

Further, the first resource system may include a data system, an information system, a knowledge system, a value system, and an objective system;

the data system, information system, knowledge system, value system, and the objective system constitute a tree structure or a flat structure.

An embodiment of the present disclosure also provides an electronic device that includes a processor and a memory. The memory stores at least one instruction, at least one program, a code set or an instruction set. The at least one instruction, the at least one program, the code set, or the instruction set is loaded and executed by the processor to realize the above DIKW resource transfer method for purpose-oriented calculation and inference.

An embodiment of the present disclosure also provides a computer-readable storage medium that stores at least one instruction, at least one program, a code set or an instruction set. The at least one instruction, the at least one program, the code set or the instruction set is loaded and executed by a processor to realize the above DIKW resource transfer method for purpose-oriented calculation and inference.

The embodiments of the present disclosure have the following beneficial effects:

The DIKW resource transfer method and device for purpose-oriented calculation and inference disclosed in the embodiments of the present disclosure include: determining a resource to be matched by traversing a first resource system corresponding to a receiver based on an acquired target purpose, and determining a target resource based on the resource to be matched and a second resource system. Based on the embodiments of the present disclosure, it is possible to reduce the waste of target resources, lowering transfer loss, and decrease the risk of transfer failure.

BRIEF DESCRIPTION OF THE DRAWINGS

In order to explain the technical solutions in the embodiments of the present invention or in the prior art more clearly, a brief introduction of the drawings that need to be used in the description of the embodiments or the prior art will be given in the following. Obviously, the drawings only show some embodiments of the present invention. Those of ordinary skill in the art can also obtain other drawings based on these drawings without inventive efforts.

DETAILED DESCRIPTION

In order to make the objectives, technical solutions, and advantages of the embodiments of the present invention clearer, the embodiments of the present invention will be described below in conjunction with the accompanying drawings in the embodiments of the present invention. The described embodiments are part of the embodiments of the present invention, rather than all of the embodiments. Based on the embodiments of the present invention, all other embodiments obtained by those skilled in the art without creative work shall fall within the protection scope of the present invention.

In this specification, "embodiments" refers to the specific features, structure or properties that can be contained in at least one implementation of the application. Among these embodiments, terms such as "first" and "second" are used only for illustration purpose, and do not necessarily require or imply there is any relative importance or numbers of the features. Therefore, features defined by "first", "second", "third", "fourth", and "fifth" may expressively or implicitly comprise one or more such features. Further, the terms "first", "second", "third", "fourth", and "fifth", etc. are used for distinguish similar objects but are not necessarily a description of a particular order or sequence. It should be noted that data described in such a manner may be exchanged when necessary and appropriate, so that the embodiments described in this application can be implemented in other sequences than have been described. Moreover, terms such as "including" and "comprising"/"is" and other variants thereof shall mean non-exclusive covering.

Figure 1:
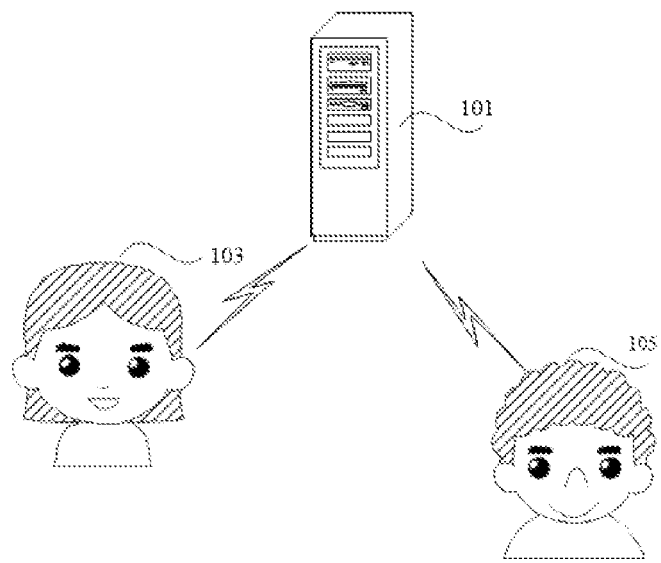
FIG. 1 is a schematic diagram of an application environment according to an embodiment of the present disclosure.

Reference is made to FIG. 1 which shows a schematic diagram of an application environment according to an embodiment of the present disclosure, including a processor 101, a sender 103, and a receiver 105. The processor 101 may acquire a target transfer purpose of the sender 103, determine a resource to be matched by traversing a first resource system corresponding to the receiver based on the acquired target purpose, and determine a target resource based on the resource to be matched and a second resource system.

In an embodiment of the present disclosure, waste of target resources and transfer loss may be reduced, and the risk of transfer failure may be reduced.

Figure 2:
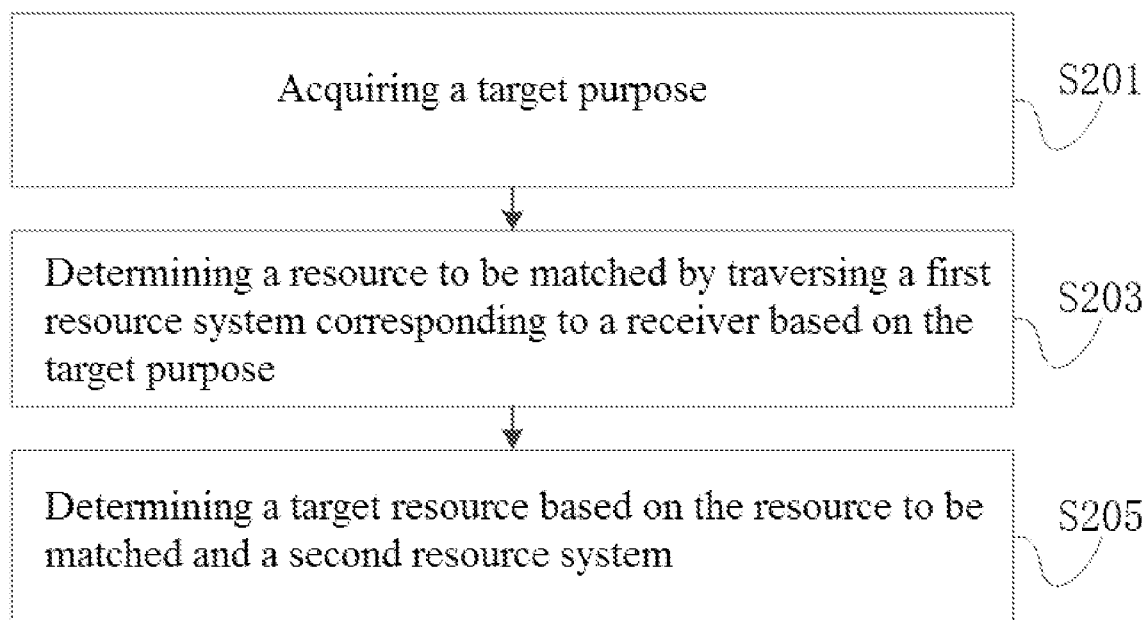
FIG. 2 is a schematic flowchart of a DIKW resource transfer method for purpose-oriented calculation and inference according to an embodiment of the present disclosure.

A specific embodiment of a DIKW resource transfer method for purpose-oriented calculation and inference according to the present disclosure will be described hereinafter. FIG. 2 is a flowchart of a DIKW resource transfer method for purpose-oriented calculation and inference according to an embodiment of the present disclosure. The description provides method operation steps as shown in the embodiments or flowcharts, but more or less operation steps may be included based on conventional means without inventive effort. The sequence of steps listed in the embodiment is only one of many execution sequences, and does not represent a unique execution sequence. In actual execution, the steps may be executed sequentially or in parallel (e.g., in a parallel processor or multi-threaded environment) according to the methods shown in the embodiments or the drawings. Specifically, as shown in FIG. 2, the method includes the following steps.

In S201, a target purpose is acquired.

In this embodiment, purposes in a transfer process may include Purpose of Sender, Purpose of Receiver, and Purpose of System according to priority from high to low. Since the sender is the dominant party in the transfer process, the Purpose of Sender belongs to a payer in a paid transfer, with the highest priority. To identify the Purpose of Sender is the primary task based on the DIKW map transfer technology. In the DIKW map transfer technology, receiving is a passive process. Free services for receivers may include "blacklists" (refusing to receive resources transferred from senders in the blacklist). The Purpose of System has the lowest priority because it is a service party and is part of a value model. Reference values of a system operator in an implementation process are based on the maximization of profits. Sub-values include time loss, space loss, and cost loss. When a purpose conflict occurs, a purpose with a higher priority is the chief processing object of the system, that is, the processor may acquire the sender's target purpose.

In an optional embodiment, the sender's target purpose is clear. For example, the target purpose is "please the receiver", and the processor may directly acquire the sender's target purpose.

In another optional implementation, the sender's target purpose is ambiguous, and the processor may acquire a generated content to be transferred and perform purpose recognition processing on the generated content to be transferred to obtain a target purpose. Optionally, the processor may determine the sender's target purpose based on a purpose recognition (PR) system. An input of the PR system may be the generated content to be transferred sent by the sender, and an output may be the sender's target purpose or the sender's target main purpose. For example, when the generated content to be transferred sent by the sender is a plurality of pictures containing food, the target purpose output by the PR system may be "ask the receiver whether to eat" or "ask the receiver what food to eat".

In an embodiment of the present disclosure, the target purpose may include a main purpose and a sub-purpose. The sub-purpose may be a branch of the main purpose, and the main purpose may include all sub-purposes or only a single sub-purpose. In the description, the main purpose and the sub-purpose are relative concepts, and the sub-purposes may be further divided into second-level purposes, third-level purposes, and so on. All transfers may be collectively summarized into a single main purpose, that is, "show something to the receiver".

In an optional implementation, types corresponding to the generated content to be transferred may include a text type, an image type, a video type, or an audio type. Before performing purpose recognition processing on the generated content to be transferred to obtain the target purpose, the processor may also determine the type corresponding to the generated content to be transferred. If the type corresponding to the generated content to be transferred is the text type, the generated content to be transferred is encoded to obtain an encoded generated content to be transferred.

In an optional implementation, before performing purpose recognition processing on the generated content to be transferred to obtain the target purpose, the processor may also determine the type corresponding to the generated content to be transferred. If the type corresponding to the generated content to be transferred is the image type, the video type, or the audio type, text conversion processing is performed on the generated content to be transferred to obtain a text-conversion-processed generated content to be transferred. The text-conversion-processed generated content to be transferred is encoded to obtain an encoded generated content to be transferred.

In an embodiment of the present disclosure, upon acquiring the target purpose, the processor may review the target purpose to ensure that the resources of the sender transferred in the DIKW map are under legal and moral constraints, and to avoid the transfer of illegal resources. A Purpose Inspection (PI) system will evaluate the target purpose. If the evaluation is qualified, "True" is output, and if the evaluation is unqualified, "False" is output.

In S203, a resource to be matched is determined by traversing a first resource system corresponding to a receiver based on the target purpose.

Figure 3:
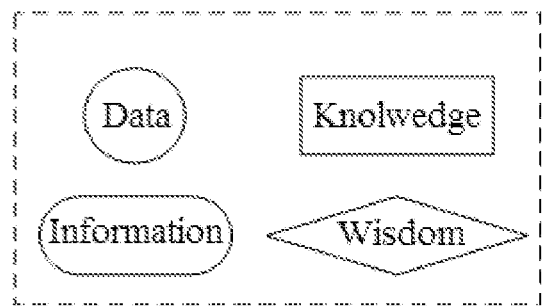
FIG. 3 is a schematic diagram of the structure of a digital resource according to an embodiment of the present disclosure.

In an embodiment of the present disclosure, the processor may traverse the first resource system corresponding to the receiver based on the target purpose. The resource system may refer to a digital resource DIKW, which refers to a joint expression of four types of resources: data (Data$_{DIK}$, D$_{DIK}$), information (Information$_{DIK}$, I$_{DIK}$), knowledge (Knowldge$_{DIK}$, K$_{DIK}$), and wisdom (Wisdom, W$_{DIK}$) and is a description of relationship between semantic objects (Semantic Object, obj) in resource processing. FIG. 3 is a schematic diagram of the structure of a digital resource according to an embodiment of the present disclosure. In semantic resource processing, relationships can define all semantics.

In an embodiment of the present disclosure, the first resource system may include a data system, an information system, a knowledge system, a value system, and an objective system. The data system, the information system, the knowledge system, the value system, and the objective system may form a tree structure or a flat structure.

The data resources are described in detail below. D$_{DIK}$ is the simplest expression of the relationship between semantic objects, only representing the existence of the relationship between semantic objects, and belongs to the simplest and most numerous part of DIKW map modeling. D$_{DIK}$ is not associated with a specific objective. D$_{DIK}$ may be present in different forms, including but not limited to a numerical type (Numeric Data$_{DIK}$, ND$_{DIK}$), a logic type (Logic Data$_{DIK}$, LD$_{DIK}$), a collection type (Collection Data$_{DIK}$, CD$_{DIK}$), a range type (Range Data$_{DIK}$, RD$_{DIK}$), a probability type (Probability Data$_{DIK}$, PD$_{DIK}$).

$$D_{DIK} = \{ND_{DIK}, LD_{DIK}, CD_{DIK}, RD_{DIK},\}$$

(1) Numerical type: ND$_{DIK}$ expresses a single numerical symbol or a combination of a plurality of numerical symbols;

(2) Logic type: LD$_{DIK}$ expresses digital resources that may be defined by "Yes/No", in the form of obj(Yes/NoXX);

(3) Collection type: CD$_{DIK}$ has rich content and is associated with other D$_{DIK}$s. Among data type resources, the usable value of CD$_{DIK}$ as a resource is generally greater than that of other types of D$_{DIK}$.

(4) Range type: RD$_{DIK}$ refers to a combined expression of D$_{DIK}$ driven by a certain purpose. The D$_{DIK}$ contained in RD$_{DIK}$ may be of a numerical type, a logic type, a collection type or a mixed type.

Although both CD$_{DIK}$ and RD$_{DIK}$ are combinations of a plurality of D$_{DIK}$s, they are different in that CD$_{DIK}$ develops about a central entity, and the other entities are relationship extensions of the central entity. And RD$_{DIK}$ is a combination of D$_{DIK}$s that have or do not have a relationship with each other based on a certain purpose. For example, RD$_{DIK1}$ is a numerical type range, RD$_{DIK2}$ is a collection type range, and RD$_{DIK3}$ is a logic type range.

RD$_{DIK1}$={"200 ml", "300 ml", "500 ml"}
RD$_{DIK2}$={"Americano", "Macchiato", "Flat White"}
RD$_{DIK3}$={"NoSugaring", "YesIce", "YesPack"}

(5) Probability type: PD$_{DIK}$ is a digital resource intended to express uncertain attributes of semantic objects. The precise value of PD$_{DIK}$ may be divided into numerical type PD$_{DIK}$ and non-numerical type PD$_{DIK}$. The numerical type PD$_{DIK}$ is a branch of the ND$_{DIK}$ type, and the precise numerical value between (0, 1) expresses the attributes of the semantic objects. The obj attribute is represented with precise rather than correct values. The numerical value of PD$_{DIK}$ will be corrected with the regression of the calculation, mostly in the form of fractions, decimals, ratios and percentages, for example:

PD$_{DIK1}$="⅓ of the black balls and ⅔ of the white balls";
PD$_{DIK2}$="Possibility 0.99";
PD$_{DIK3}$="Number ratio 1:20"; and
PD$_{DIK4}$="50% probability of being elected";

However, not all ND$_{DIK}$s in the form of fractions, decimals, ratios, and percentages in user-generated content (UGC) belong to PD$_{DIK}$, such as the equation in ND$_{DIK1}$ and the ratio in ND$_{DIK2}$. "1", "6", and "⅙" in ND$_{DIK1}$ are not combined with a specific obj, and only represent the numerical value itself, which has no practical significance; "8:30" in ND$_{DIK2}$ is a time expression in the form of a ratio. Neither of them belong to the scope of PD$_{DIK}$.

$$ND_{DIK1} = "1 \div 6 = 1/6"; \text{ and}$$

ND$_{DIK2}$="Exam starts at 8:30 in the morning".

Non-numerical type PD$_{DIK}$ is a semantic expression with vague quantitative description, for example, the following list contains "probably", "likely", "most" and so on.

PD$_{DIK1}$="Most people watch movies in this year's class activities";
PD$_{DIK2}$="This class activity is likely to choose to order cakes"; and
PD$_{DIK3}$="Arrive at about 8:20".

I$_{DIK}$ is an objective description REL$_{objective}$ of the relationship between semantic objects, and REL(obj1, obj2) represents the objectively existing relationship between two semantic objects. Specifically, the following formula may be used to express the objectively existing relationship between semantic objects:

$$I_{DIK} ::= REL_{objective} = REL(Obj1, Obj2)$$

The information resources are described in detail below. I$_{DIK}$ has both the expression attribute "YES/NO" and the true attribute "TRUE/FALSE". There is no necessary connection between the two. "YES/NO" may describe the positive or negative relationship between semantic objects, and "TRUE/FALSE" indicates the authenticity of I$_{DIK}$ content. For example, I$_{DIK1}$ expresses a positive relationship, I$_{DIK1}$ (YES); but the reality of the truth is contrary to the content in I$_{DIK1}$, I$_{DIK1}$ (FALSE), I$_{DIK1}$ belongs to the subjective affirmation and objective error UGC content.

I$_{DIK1}$="UserA is a boy"
I$_{DIK1}$(YES and FALSE)

Figure 4:
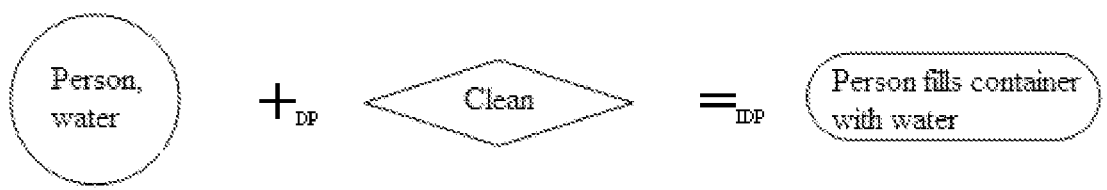
FIG. 4 is a schematic diagram of a process of converting an purpose-driven data type to an information type according to an embodiment of the present disclosure.
Figure 5:
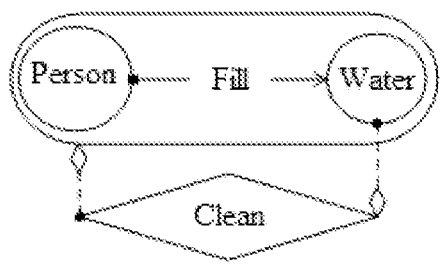
FIG. 5 is an exploded schematic diagram of FIG. 4.

On the basis of D$_{DIK}$, purpose drives I$_{DIK}$'s expression of REL between semantic objects. Calculation symbols of type resources are defined to include: combining "+DP" and deriving "=IDP". FIG. 4 is a schematic diagram of a purpose-driven process of converting a data type to an information type according to an embodiment of the present disclosure. FIG. 5 is an exploded schematic diagram of FIG. 4. Specifically, the following formula may be used to define type resources:

$$I_{DIK = IDP} D_{DIK + DP} Pup$$

The third possibility of combining I$_{DIK}$ and PD$_{DIK}$ between YES and FALSE is the probability type information resource PI$_{DIK}$. PI$_{DIK}$ is driven by a comprehensive Pup and has the attributes of objective, fairness and justice.

In an embodiment of the present disclosure, internal conversion between data type resources may be realized. For example, PD$_{DIK}$ may be mapped to LD$_{DIK}$ according to certain rules, such as LD$_{DIK1}$, LD$_{DIK2}$, and LD$_{DIK3}$.

$PD_{DIK1}$="Most people watch movies in this year's class activities"→$LD_{DIK1}$="YesMovie";
$PD_{DIK2}$="This class activity is likely to choose to order cakes"→$LD_{DIK2}$="YesCake"; and
$PD_{DIK3}$="Arrive at about 8:20 minutes"→$LD_{DIK3}$="Yes8:20".

Based on the examples listed above, the conversion from $PD_{DIK}$ to $LD_{DIK}$ is a direct conversion. When the DIKW map transfer model captures "probably", "likely", "most" and other words with positive probability, it outputs the "Yes" type $LD_{DIK}$.

In an embodiment of the present disclosure, if the processor determines that the type corresponding to the content to be transferred is the text type, and the text subtype corresponding to the generated content to be transferred is the probability type, it may perform data conversion processing on the generated content to be transferred to obtain a processed generated content to be transferred. The text subtype corresponding to the processed generated content to be transferred is the logic type, the processed generated content to be transferred is determined as the resource to be matched, and the type corresponding to the resource to be matched is the data type.

In an optional implementation, if the generated content to be transferred is "most people watch movies in this year's class activities", data conversion may be performed to obtain a processed generated content to be transferred "YesMovie". In this way, the resources required for the target resource may be reduced.

In another optional implementation, if the processor determines that the type corresponding to the generated content to be transferred is the video type, it may determine a set of semantic objects from the generated content to be transferred, acquire attribute information and motion information corresponding to each semantic object in the set of semantic objects, and determine the resource to be matched based on the attribute information and motion information corresponding to each semantic object. The type corresponding to the resource to be matched is the information type.

In an optional implementation, if the generated content to be transferred includes a set of semantic objects "Character A and Coffee", "Character B", and "Character C", distance changes between "Character A and Coffee" and "Character B" and "Character C" can be obtained respectively. When the distance between "Character A and Coffee" and "Character B" becomes smaller and smaller, the resource to be matched may be determined as information "the coffee is ordered by B".

The following is a specific description of knowledge resources. $K_{DIK}$ is a summary and induction of the relationship between semantic objects, which may be deduced based on existing resources, and has subjective conceptual $REL_{conceptual}$ and uncertainty.

$K_{DIK}::=REL_{conceptual}=REL_{cpt}(Obj_1,Obj_2)$ $K_{DIK}$ may be obtained by extraction and induction. Induction refers to an explanation method that derives general principles from specific concrete examples, and can be divided into complete inductive reasoning and incomplete inductive reasoning. Incomplete inductive reasoning may be divided into simple enumeration inductive reasoning and scientific inductive reasoning and is driven by Pup in the DIKW map transfer model. Because UGC can hardly provide sufficient resources to support complete inductive reasoning, $K_{DIK}$ induction is costly and has a low success rate. Although the extracted $K_{DIK}$ has the disadvantage of not being able to directly calculate the uncertainty, it may be verified by the inductive method, which is a method of having a conclusion first and then performing induction, thus the verification cost is lower than that of a pure inductive method and the success rate is higher.

In an embodiment of the present disclosure, resources may have resource quality attributes, and the quality of UGC is also an important factor that affects the realization of transfer purposes. Various resource attributes are the standard to measure the quality of resources ($Q_{res}$). DIKW's quality evaluation system may evaluate the quality of resources. Among them, $Q_{res}$ attributes include resource accuracy ($ACR_{res}$), resource completeness ($CPT_{res}$), resource reliability ($RLB_{res}$), resource timeliness ($TML_{res}$), resource economy ($ECN_{res}$), resource verifiability ($VRT_{res}$) and resource security ($SCR_{res}$).

$Q_{res}=\{ACR_{res},CPT_{res},RLB_{res},TML_{res},ECN_{res},VRT_{res},SCR_{res}\}$ $Q_{res}$ is a dynamic numerical attribute, and its value is in the interval (0,1). Specifically, the following formula may be used to construct the function of $Q_{res}$:

$Q_{res}$=Quality(UGC, Pups)

(1) Resource accuracy $ACR_{res}$: The accuracy of the resource's description of things.

(2) Resource completeness $CPT_{res}$: The comprehensiveness of the resource's description of the state of things. A complete resource should contain all important facts. The calculation standard of $CPT_{res}$ needs to be formulated based on the DIKW map of Sed and Rev. Sometimes it is necessary to cover not only the content in UGC, but also the contextual content linked by UGC, such as UGC1 in a TXT form: UGC1(TXT)="The final exam starts at 8:30"

(3) Resource reliability $RLB_{res}$: The source, the collection method, and the transfer process of the resource may be trusted and meet expectations.

(4) Resource timeliness $TML_{res}$: The length of the interval between the time when the resource is acquired and the time when an event occurs.

(5) Resource economy $ECN_{res}$: The difference between the cost of acquiring and transmitting the resource and the profit obtained after the completion of the transfer purpose.

(6) Resource verifiability $VRT_{res}$: The degree to which the resource may be verified or falsified.

(7) Resource security $SCR_{res}$: The possibility that the resource may be accessed without authorization. The lower the possibility, the higher the security.

In S205, a target resource is determined based on the resource to be matched and a second resource system.

In an embodiment of the present disclosure, the processor may traverse a second resource system to obtain a set of candidate resources corresponding to the resource to be matched, and determine a target resource from the set of candidate resources based on a degree of matching between each candidate resource in the set of candidate resources and the resource to be matched. That is, the resource system of the sender may be traversed to obtain the set of candidate resources corresponding to the resource to be matched. For example, when the resource to be matched is an information resource "999 roses", the set of candidate resources corresponding to the resource to be matched may include information "jasmine flows", information "99 roses", and "999 jasmine flowers", and the target resource is determined from the set of candidate resources based on a degree of matching between each candidate resource in the set of candidate resources and the resource to be matched. For example, the information "jasmine flows" and "999 roses" have a degree of matching of 10%, the information "99 roses" and "999 roses" have a degree of matching of 50%, and "999 jasmine flowers" and "999 roses" have a degree of matching of 40%. It may be determined that the target resource is the information "99 roses". Then a message "99 roses" may be sent to the receiver, data "99 roses", i.e., a picture "99 roses" may also be sent to the receiver, and knowledge "99 roses" may also be sent to the receiver, that is, knowledge about a rose garden containing "99 roses".

The DIKW resource transfer method according to the above embodiments can reduce the waste of the target resource, lowering transfer loss, and decrease the risk of transfer failure.

Figure 6:
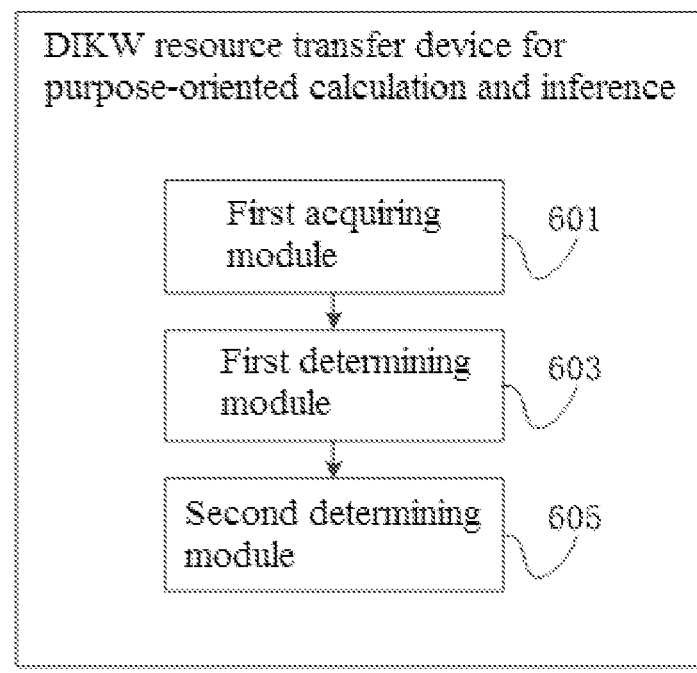
FIG. 6 is a schematic structural diagram of a DIKW resource transfer device for purpose-oriented calculation and inference according to an embodiment of the present disclosure.

An embodiment of the present disclosure also provides a DIKW resource transfer device for purpose-oriented calculation and inference. FIG. 6 is a schematic structural diagram of a DIKW resource transfer device for purpose-oriented calculation and inference according to an embodiment of the present disclosure. As shown in FIG. 6, the device may include:

- a first acquiring module 601 configured to acquire a generated content to be transferred;
- a recognizing module 603 configured to perform purpose recognition processing on the generated content to be transferred to obtain a target purpose;
- a first determining module 605 configured to determine a resource to be matched by traversing a first resource system corresponding to a receiver based on the target purpose; and
- a second determining module 607 configured to determine a target resource based on the resource to be matched and a second resource system.

In an embodiment of the present disclosure, the second determining module 607 may include:

- a traversing unit configured to traverse the second resource system to obtain a set of candidate resources corresponding to the resource to be matched; and
- a determining unit configured to determine the target resource from the set of candidate resources based on a degree of matching between each candidate resource in the set of candidate resources and the resource to be matched.

In an embodiment of the present disclosure, the first acquiring module 601 may include:

- an acquiring unit configured to acquire the generated content to be transferred; and
- a recognizing unit configured to perform purpose recognition processing on the generated content to be transferred to obtain a target purpose.

In an embodiment of the present disclosure, types corresponding to the generated content to be transferred include text type, image type, video type, or audio type.

The above device also includes:

- an encoding module configured to, before performing purpose recognition processing on the generated content to be transferred, if the type corresponding to the generated content to be transferred is the text type, encode the generated content to be transferred to obtain an encoded generated content to be transferred; or configured to, before performing purpose recognition processing on the generated content to be transferred, if the type corresponding to the generated content to be transferred is the image type, the video type or the audio type, perform text conversion processing on the generated content to be transferred to obtain a text-conversion-processed generated content to be transferred; and encode the text-conversion-processed generated content to be transferred to obtain an encoded generated content to be transferred.

In an embodiment of the present disclosure, the above device further includes:

- a conversion processing module configured to, if the type corresponding to the generated content to be transferred is the text type and a text subtype corresponding to the generated content to be transferred is a probability type, perform data conversion processing on the generated content to be transferred to obtain a processed generated content to be transferred, the text subtype corresponding to the processed generated content to be transferred being a logic type; and
- a third determining module configured to determine that processed generated content to be transferred as the target resource, the type corresponding to the target resource being a data type.

In an embodiment of the present disclosure, the above device further includes:

- a fourth determining module configured to, if the type corresponding to the generated content to be transferred is the video type, determine a set of semantic objects from the generated content to be transferred;
- a second acquiring module configured to acquire attribute information and motion information corresponding to each semantic object in the set of semantic objects; and
- a fifth determining module configured to determine the target resource based on the attribute information and motion information corresponding to each semantic object, the type corresponding to the target resource being an information type.

In an embodiment of the present disclosure, the first resource system includes a data system, an information system, a knowledge system, a value system, and an objective system.

The data system, the information system, the knowledge system, the value system, and the objective system constitute a tree structure or a flat structure.

The device and method embodiments in the embodiments of the present disclosure are based on the same application concept.

The DIKW resource transfer devices according to the above embodiments can reduce the waste of the target resource, lowering transfer loss, and decrease the risk of transfer failure.

An embodiment of the present disclosure also provides an electronic device that may be disposed in a server to store at least one instruction, at least one program, a code set or an instruction set related to a DIKW resource transfer method for purpose-oriented calculation and inference in the method embodiment. The at least one instruction, the at least one program, the code set or the instruction set is loaded and executed by a processor to implement the above DIKW resource transfer method for purpose-oriented calculation and inference.

An embodiment of the present disclosure also provides a storage medium that may be disposed in a server to store at least one instruction, at least one program, a code set or an instruction set related to a DIKW resource transfer method for purpose-oriented calculation and inference in the method embodiment. The at least one instruction, the at least one program, the code set or the instruction set is loaded and executed by a processor to implement the above DIKW resource transfer method for purpose-oriented calculation and inference.

Optionally, in this embodiment, the above storage medium may be located in at least one network server among a plurality of network servers in a computer network. The above storage medium may include, but is not limited to, various medium capable of storing program codes, such as a U disk, a read-only memory (ROM), a mobile hard disk, a magnetic disk, or an optical disk.

It may be seen from the above embodiments of the DIKW resource transfer method and device for purpose-oriented calculation and inference, the electronic device or the storage medium according to the present disclosure that the method in the present disclosure includes: determining a resource to be matched by traversing a first resource system corresponding to a receiver based on an acquired target purpose, and determining a target resource based on the resource to be matched and a second resource system. Accordingly, the embodiments can reduce the waste of the target resource, lowering transfer loss, and decrease the risk of transfer failure.

In the present disclosure, unless otherwise specifically defined, the terms "connected with", "connected to" and other terms should be understood in a broad sense. The connection may be a fixed connection or a detachable connection or integrated, or may be a mechanical connection or an electrical connection, or may be a direct connection or an indirect connection through an intermediate medium, or may be an internal connection between two components or an interaction relationship between two components. A person of ordinary skill in the art can understand the specific meaning of the above terms in the present disclosure according to the specific situation.

It should be noted that the sequence of the embodiments of the present disclosure is only for description, and does not represent the advantages and disadvantages of the embodiments. Moreover, the above description of specific embodiments in the description does not exclude other embodiments that are also within the scope of the appended claims. In some cases, the actions or steps described in the claims may be executed in the sequences in different embodiments and can achieve expected results. In addition, the processes depicted in the drawings do not necessarily require the specific sequence or connection sequence shown to achieve the desired result. In some embodiments, multi-task parallel processing is also possible or may be advantageous.

Various embodiments in the description is described in a progressive manner. The same or similar parts among the various embodiments may be referred to each other. Each embodiment focuses on the differences from other embodiments. Especially for the device embodiment, since it is similar to the method embodiment, the description is relatively simple. For related details, reference can be made to the description of the method embodiment.

Described above are preferred embodiments of the present disclosure. Those of ordinary skill in the art can also make several improvements and modifications without departing from the principle of the present disclosure, and these improvements and modifications are also deemed to be within the protection scope of the present disclosure.

What is claimed is:

1. A computer-implemented Data Information Knowledge Wisdom (DIKW) resource transfer method for purpose-oriented calculation and inference, comprising:
   acquiring, by a processor, a generated content to be transferred of a sender, and determining a target purpose of the sender by performing purpose recognition processing on the generated content to be transferred based on a purpose recognition system; wherein types corresponding to the generated content to be transferred comprise a text type, an image type, a video type or an audio type;
   determining, by the processor, a resource to be matched by traversing a first resource system corresponding to a receiver based on the target purpose; and
   determining, by the processor, a target resource based on the resource to be matched and a second resource system of the sender,
   wherein determining, by the processor, the resource to be matched comprises:
   if the type corresponding to the generated content to be transferred is the text type and a text subtype corresponding to the generated content to be transferred is a probability type, performing data conversion processing on the generated content to be transferred to obtain a processed generated content to be transferred, a text subtype corresponding to the processed generated content to be transferred being a logic type; and
   determining the processed generated content to be transferred as the resource to be matched, the type corresponding to the resource to be matched being a data type.

2. The method according to claim 1, wherein said determining the target resource based on the resource to be matched and the second resource system of the sender comprises:
   acquiring a set of candidate resources corresponding to the resource to be matched by traversing the second resource system of the sender; and
   determining the target resource from the set of candidate resources based on a degree of matching between each candidate resource in the set of candidate resources and the resource to be matched.

3. The method according to claim 1, wherein,
   before determining the target purpose of the sender by performing purpose recognition processing on the generated content to be transferred based on the purpose recognition system, the method further comprises:
   if the processor determines that the type corresponding to the generated content to be transferred is the text type, encoding, by the processor, the generated content to be transferred to obtain an encoded generated content to be transferred;
   or;
   if the processor determines that the type corresponding to the generated content to be transferred is the image type, the video type, or the audio type, performing, by the processor, text conversion processing on the generated content to be transferred to obtain a text-conversion-processed generated content to be transferred; and encoding, by the processor, the text-conversion-processed generated content to be transferred to obtain an encoded generated content to be transferred.

4. The method according to claim 1, wherein determining, by the processor, the resource to be matched further comprises:
   if the type corresponding to the generated content to be transferred is the video type, determining a set of semantic objects from the generated content to be transferred;
   acquiring attribute information and motion information corresponding to each semantic object in the set of semantic objects; and
   determining the resource to be matched based on the attribute information and the motion information corresponding to each semantic object, the type corresponding to the resource to be matched being an information type.

5. The method according to claim 1, wherein the first resource system comprises a data system, an information system, a knowledge system, a value system, and an objective system, wherein
the data system, the information system, the knowledge system, the value system, and the objective system form a tree structure or a flat structure.

6. An electronic device, comprising: a processor and a memory, wherein the memory stores at least one instruction, at least one program, a code set or an instruction set, the at least one instruction, the at least one program, the code set or the instruction set is loaded and executed by the processor to realize the Data Information Knowledge Wisdom (DIKW) resource transfer method for purpose-oriented calculation and inference as defined in claim 1.

7. A non-transitory computer-readable storage medium storing at least one instruction, at least one program, a code set or an instruction set, wherein the at least one instruction, the at least one program, the code set or the instruction set is loaded and executed by a processor to realize the Data Information Knowledge Wisdom (DIKW) resource transfer method for purpose-oriented calculation and inference as defined in claim 1.

8. The method according to claim 2, wherein the first resource system comprises a data system, an information system, a knowledge system, a value system, and an objective system, wherein
the data system, the information system, the knowledge system, the value system, and the objective system form a tree structure or a flat structure.

9. The method according to claim 3, wherein the first resource system comprises a data system, an information system, a knowledge system, a value system, and an objective system, wherein
the data system, the information system, the knowledge system, the value system, and the objective system form a tree structure or a flat structure.

10. The method according to claim 4, wherein the first resource system comprises a data system, an information system, a knowledge system, a value system, and an objective system, wherein
the data system, the information system, the knowledge system, the value system, and the objective system form a tree structure or a flat structure.

11. An electronic device, comprising: a processor and a memory, wherein the memory stores at least one instruction, at least one program, a code set or an instruction set, the at least one instruction, the at least one program, the code set or the instruction set is loaded and executed by the processor to realize the Data Information Knowledge Wisdom (DIKW) resource transfer method for purpose-oriented calculation and inference as defined in claim 2.

12. A non-transitory computer-readable storage medium storing at least one instruction, at least one program, a code set or an instruction set, wherein the at least one instruction, the at least one program, the code set or the instruction set is loaded and executed by a processor to realize the Data Information Knowledge Wisdom (DIKW) resource transfer method for purpose-oriented calculation and inference as defined in claim 2.

13. A non-transitory computer-readable storage medium storing at least one instruction, at least one program, a code set or an instruction set, wherein the at least one instruction, the at least one program, the code set or the instruction set is loaded and executed by a processor to realize the Data Information Knowledge Wisdom (DIKW) resource transfer method for purpose-oriented calculation and inference as defined in claim 3.

* * * * *